(12) United States Patent
Goldfarb

(10) Patent No.: US 7,373,842 B2
(45) Date of Patent: May 20, 2008

(54) LIQUID DISPENSER WITH VOLUME METER AND METHOD

(75) Inventor: Barry I. Goldfarb, Los Angeles, CA (US)

(73) Assignee: H2O Watch, Inc., Los Angeles, CA (US)

( * ) Notice: Subject to any disclaimer, the term of this patent is extended or adjusted under 35 U.S.C. 154(b) by 0 days.

(21) Appl. No.: 11/788,464

(22) Filed: Apr. 20, 2007

(65) Prior Publication Data

US 2007/0193370 A1     Aug. 23, 2007

Related U.S. Application Data

(62) Division of application No. 10/990,597, filed on Nov. 17, 2004, now Pat. No. 7,257,999.

(60) Provisional application No. 60/525,033, filed on Nov. 25, 2003.

(51) Int. Cl.
*G01F 1/05* (2006.01)

(52) U.S. Cl. .................................................. 73/861.79

(58) Field of Classification Search ............. 73/861.28, 73/861.25, 861.79, 861.77, 861.84, 861.91, 73/861.81

See application file for complete search history.

(56) References Cited

U.S. PATENT DOCUMENTS

| | | | | |
|---|---|---|---|---|
| 5,253,517 A | * | 10/1993 | Molin et al. | 73/118.2 |
| 5,866,824 A | * | 2/1999 | Schieber | 73/861.79 |
| 6,647,806 B1 | * | 11/2003 | Estrada et al. | 73/861.28 |

* cited by examiner

*Primary Examiner*—Jewel Thompson
(74) *Attorney, Agent, or Firm*—John J. Connors; Connors & Assoc. Inc.

(57) ABSTRACT

A liquid dispenser comprises a sprayer device and volume meter connected together to form an integral unit that prevents the sprayer device and volume meter from being disconnected without damaging the dispenser. The volume meter has an inlet end portion and a gauge member downstream of the inlet end portion that responds to liquid flowing through the dispenser to provide a visual readout indicating the volume of liquid flowing through the dispenser. A common passageway extends through the sprayer device and volume meter through which liquid flows from the inlet end portion of the volume meter, past the gauge member, and exits the sprayer device at a head end thereof.

4 Claims, 6 Drawing Sheets

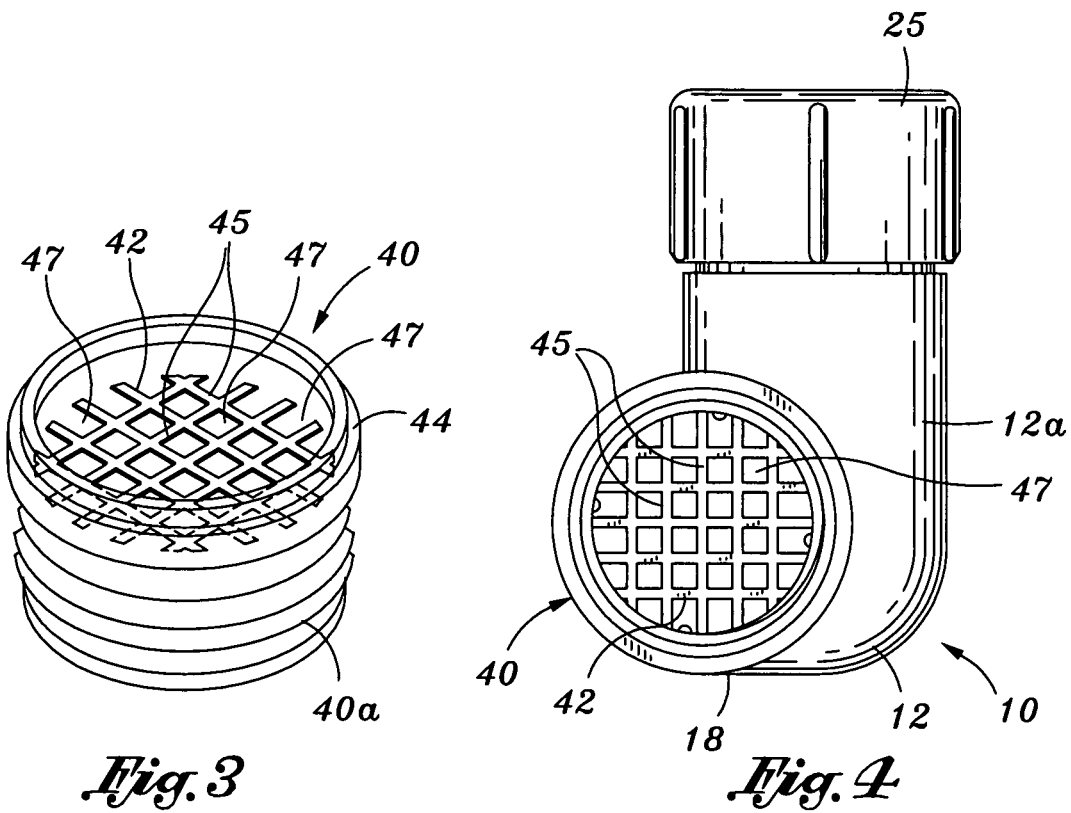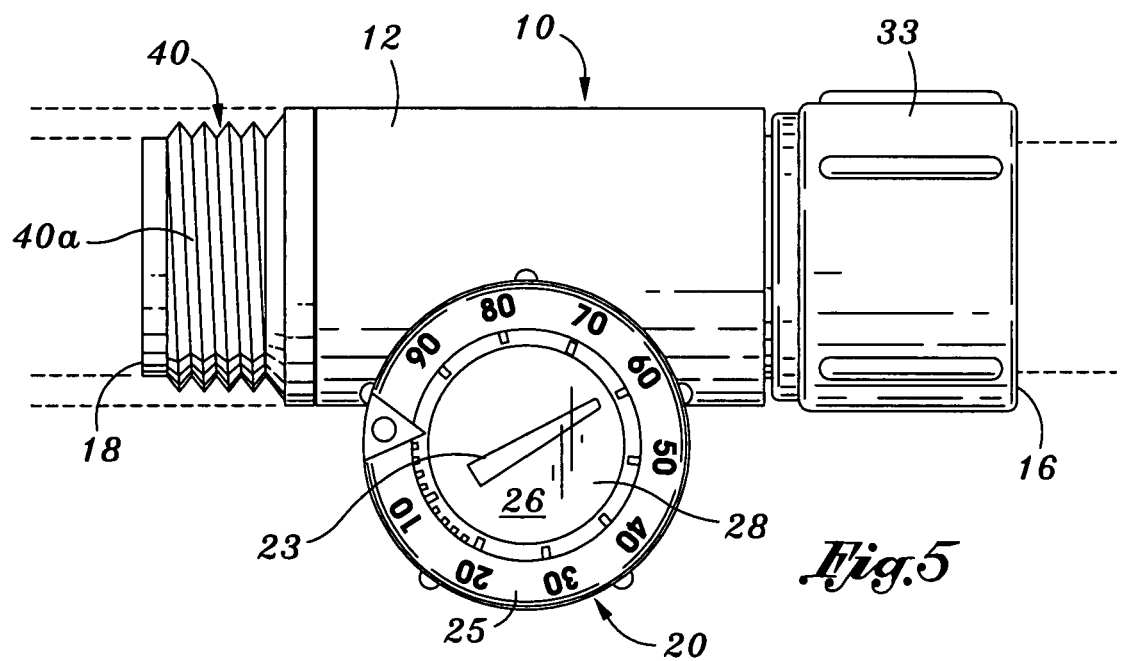

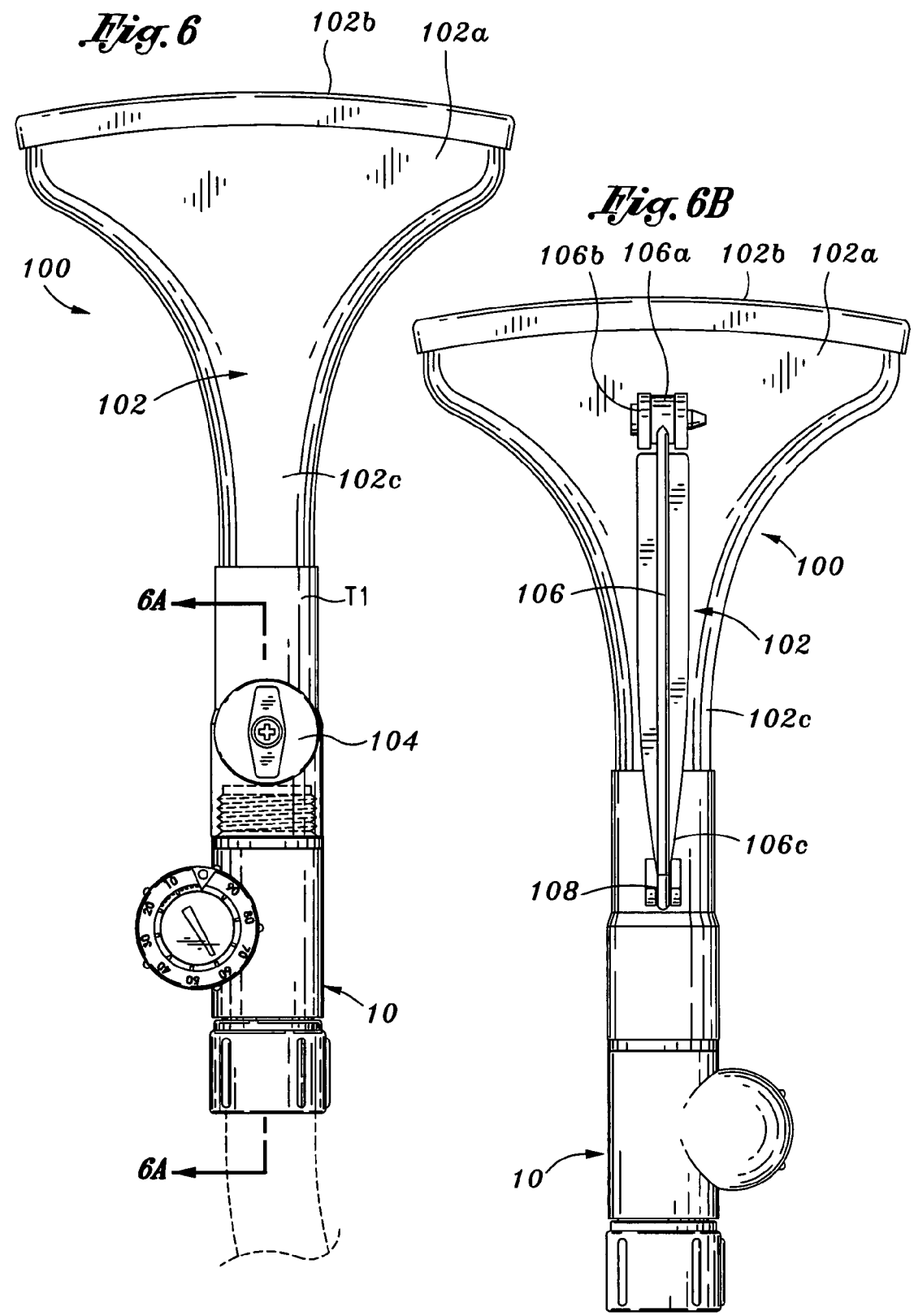

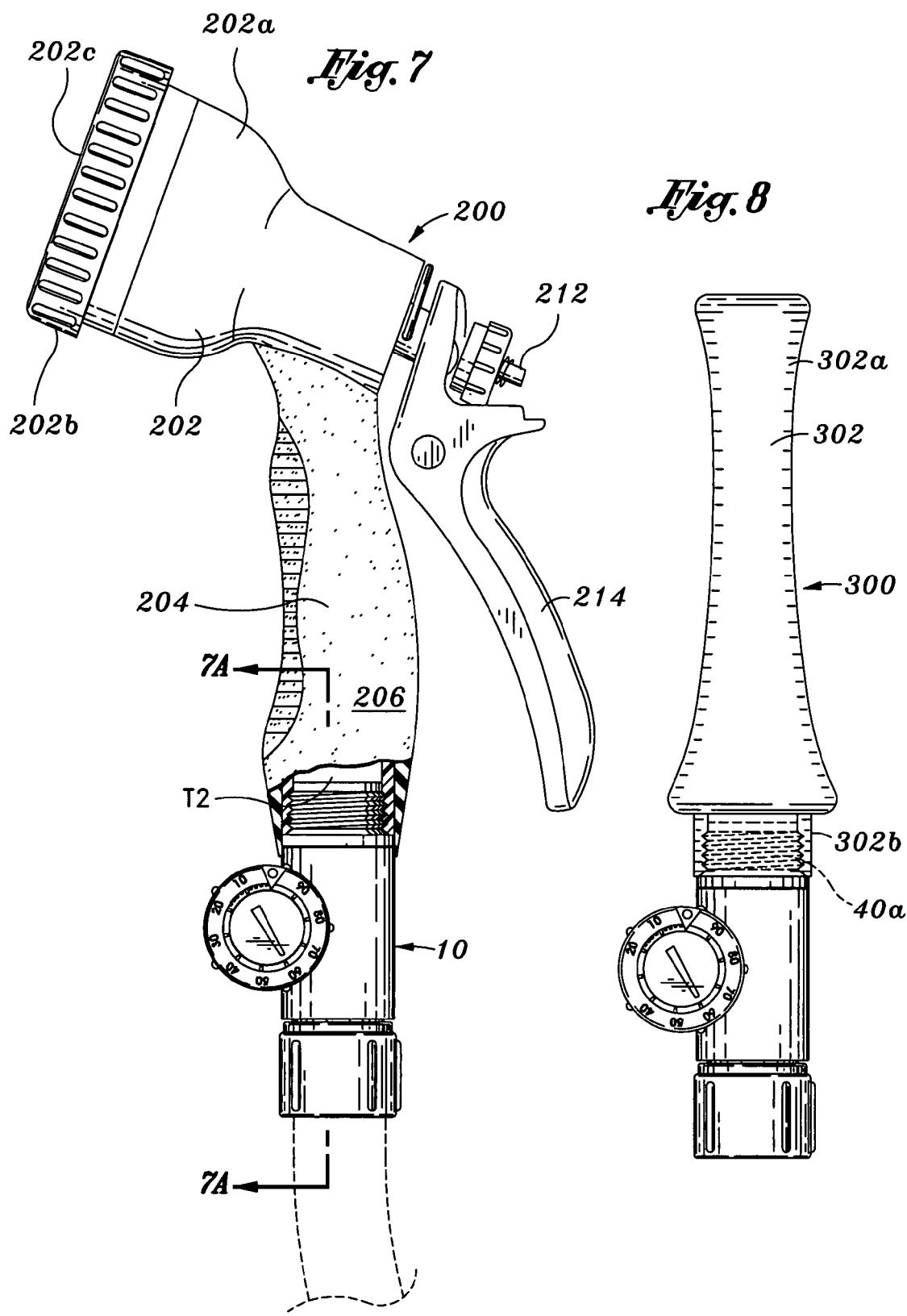

LIQUID DISPENSER WITH VOLUME METER AND METHOD

RELATED PATENT APPLICATION & INCORPORATION BY REFERENCE

This application is a divisional application of U.S. application Ser. No. 10/990,597, entitled "Liquid Dispenser With Volume Meter & Method," filed Nov. 17, 2004, now U.S. Pat. No. 7,257,999, which claims the benefit under 35 USC 119(e) of U.S. Provisional patent application Ser. No. 60/525,033, entitled "Liquid Dispenser With Volume Meter," filed Nov. 23, 2003. These related applications are incorporated herein by reference and made a part of this application. If any conflict arises between the disclosure of the invention in this divisional application and that in the related provisional application, the disclosure in this divisional application shall govern. Moreover, the inventor incorporates herein by reference any and all U.S. Patents, U.S. patent applications, and other documents, hard copy or electronic, cited or referred to in this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND OF INVENTION

Sprayer devices are commonly used to dispense liquids such as, for example, water. They come in a variety of configurations. Some enable a user to adjust the type of spray pattern: for example, at one extreme, a spray pattern comprising a plurality of separate, small diameter streams that have a high velocity; at another extreme, a spray pattern comprising a plurality of separate, large diameter streams that have a low velocity; and intermediate cases where the spray pattern comprises a plurality of separate streams that have different diameters and velocities in between the extremes. These sprayer devices include a mechanism to control which of these spray patterns is being used. They may also include a manually operable valve for controlling the flow of liquid through the sprayer device.

Volume meters are used to measure the volume of liquid flowing through the meter. These meters may, for example, be connected to an outlet of a garden hose. They may include an impeller seated in the stream of liquid flowing through the volume meter. The impeller is connected through a gear system to an indicator gauge. The indicator gauge, as the flowing stream of liquid turns the impeller, moves an indicator needle in proportion to the rate of rotation of the impeller. The indicator needle points to a scale to show the volume of liquid flowing through the meter. In some meters a screen is located at its outlet end to restrict the flow of liquid through the meter. This insures that sufficient liquid is retained in the volume meter so the impeller remains at least partially submerged in the liquid flowing through the meter. An example of this type of volume meter is disclosed in U.S. patent application Ser. No. 08/100,470, entitled "Compact Portable Water Meter," filed Jul. 30, 1993 (now abandoned).

SUMMARY OF INVENTION

This invention has one or more features as discussed subsequently herein. After reading the following section entitled "DETAILED DESCRIPTION OF SOME EMBODIMENTS OF THIS INVENTION," one will understand how the features of this invention provide its benefits. These benefits include, but are not limited to providing: (a) a convenient to use, compact liquid dispenser including a spray device and a volume meter, (b) an easy to assemble liquid dispenser, and (b) a volume meter having a one-piece flow restrictor that is easy to assemble with the other components of the meter.

Without limiting the scope of this invention as expressed by the claims that follow, some, but not necessarily all, of its features are:

One, the invention is a liquid dispenser comprising a sprayer device and a volume meter, and the volume meter per se.

Two, the sprayer device and the volume meter are connected together to form an integral unit that prevents the sprayer device and volume meter from being disconnected without damaging the dispenser. The volume meter includes a gauge member downstream of an inlet end portion that responds to liquid flowing through the dispenser to provide a visual readout indicating the volume of liquid flowing through the dispenser.

Three, a common passageway extends through the sprayer device and the volume meter through which liquid flows from the inlet end portion of the volume meter, past the gauge member, and exits the sprayer device at a head end thereof. The sprayer device and volume meter may each include a plastic body portion forming at least in part the common passageway. These plastic body portions may be sonically welded together to connect the sprayer device and volume meter to form the integral unit. The sprayer device and volume meter may be connected together by a tubular member to form the integral unit. The sprayer device may have a tail end from which the tubular member extends. The tubular member may be substantially linear and the grid member may be substantially at a right angle to the linear tubular member.

Four, the liquid dispenser may include a treaded coupling attached to the inlet end portion of the volume meter in a manner enabling the treaded coupling to rotate. The liquid dispenser may also include a manually operable, upstream valve, and a manually operable adjusting mechanism that enables a user to change the type of stream of liquid issuing from the dispenser's head end.

Five, the volume meter of this invention includes a body. Within the body is a passageway having the inlet end portion and an outlet end portion having a predetermined cross-sectional area. The meter's passageway may be substantially linear. The body may be a hollow, open-ended, substantially cylindrical body forming the substantially linear passageway through the body, Six, the gauge member may employ an impeller member that is driven by the liquid flowing along the meter's passageway. The impeller member may be connected to the gauge member to actuate an indicator member of the gauge member to provide the visual readout indicating the volume of liquid flowing through the volume meter in proportion to the number of revolutions of the impeller member. There may also be means for restricting the flow to retain liquid in the volume meter so the impeller member remains substantially submerged in the liquid flowing there through.

Seven, an open grid member is at the outlet end portion. This grid member has an open area comprising from 50 to 80 percent of the predetermined cross-sectional area of the outlet end portion. The open grid member may be substantially planar, may be substantially disk shaped, and may be substantially at a right angle to a linear passageway. This grid member may comprise a plurality of substantially flat and substantially straight arms at substantially right angles to each other to form substantially rectangular openings.

Eight, a cap member may form at least a part of the outlet end portion. The cap member may be substantially cylindrical and open ended and including the open grid member. The cap member and open grid member may be an integral, unitary structure molded from plastic. The cap member may have an inner annular edge portion that fits snugly within an open end of the cylindrical body and an outer threaded portion. An annular recess at an inner end of the cap member may fit snugly in the passageway and may be bonded to the cylindrical body, These features are not listed in any rank order nor is this list intended to be exhaustive.

DESCRIPTION OF DRAWING

Some embodiments of this invention, illustrating all its features, will now be discussed in detail. These embodiments depict the novel and non-obvious liquid dispenser and volume meter of this invention as shown in the accompanying drawing, which is for illustrative purposes only. This drawing includes the following figures (FIGS.), with like numerals indicating like parts:

FIG. 3 is a perspective view of a cap member located at the outlet end of the one embodiment of the volume meter shown in FIG. 1.

FIG. 4 is an end view of the one embodiment of the volume meter shown in FIG. 1 taken along line 4-4 of FIG. 2.

FIG. 5 is a plan view of the one embodiment of the volume meter shown in FIG. 1.

FIG. 6 is a top plan view of one embodiment of the liquid dispenser of this invention employing the volume meter shown in FIGS. 1 through 5.

FIG. 6B is a bottom plan view of the one embodiment of the liquid dispenser shown in FIG. 6.

FIG. 7 is a side view of another embodiment of the liquid dispenser of this invention employing the volume meter shown in FIGS. 1 through 5.

FIG. 8 is a side view of still another embodiment of the liquid dispenser of this invention employing the volume meter shown in FIGS. 1 through 5.

DETAILED DESCRIPTION OF SOME EMBODIMENTS OF THIS INVENTION

Figure 6A:
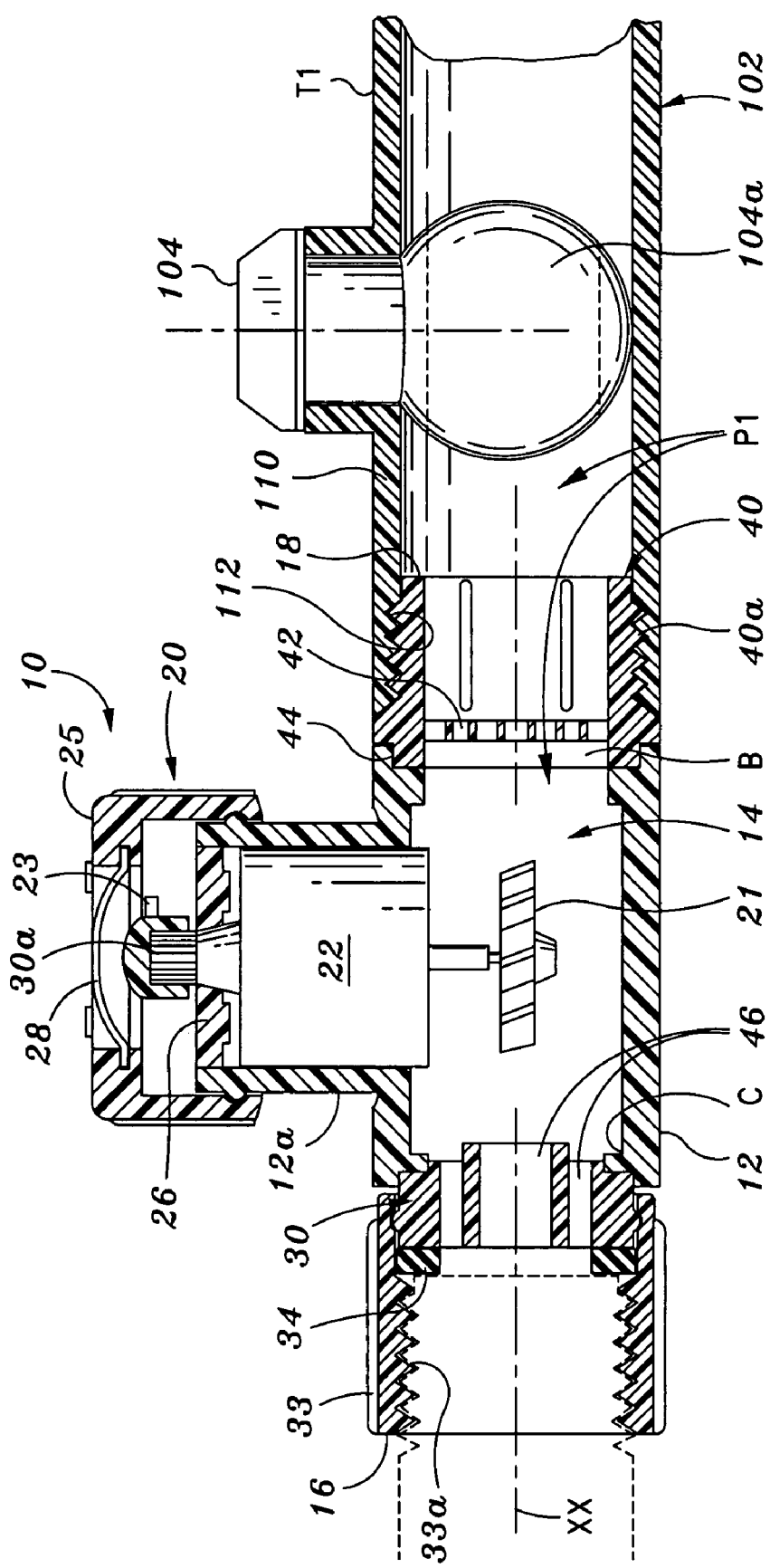
FIG. 6A is a cross-sectional view of the one embodiment of the liquid dispenser shown in FIG. 6 taken along line 6A-6A of FIG. 6.
Figure 7A:
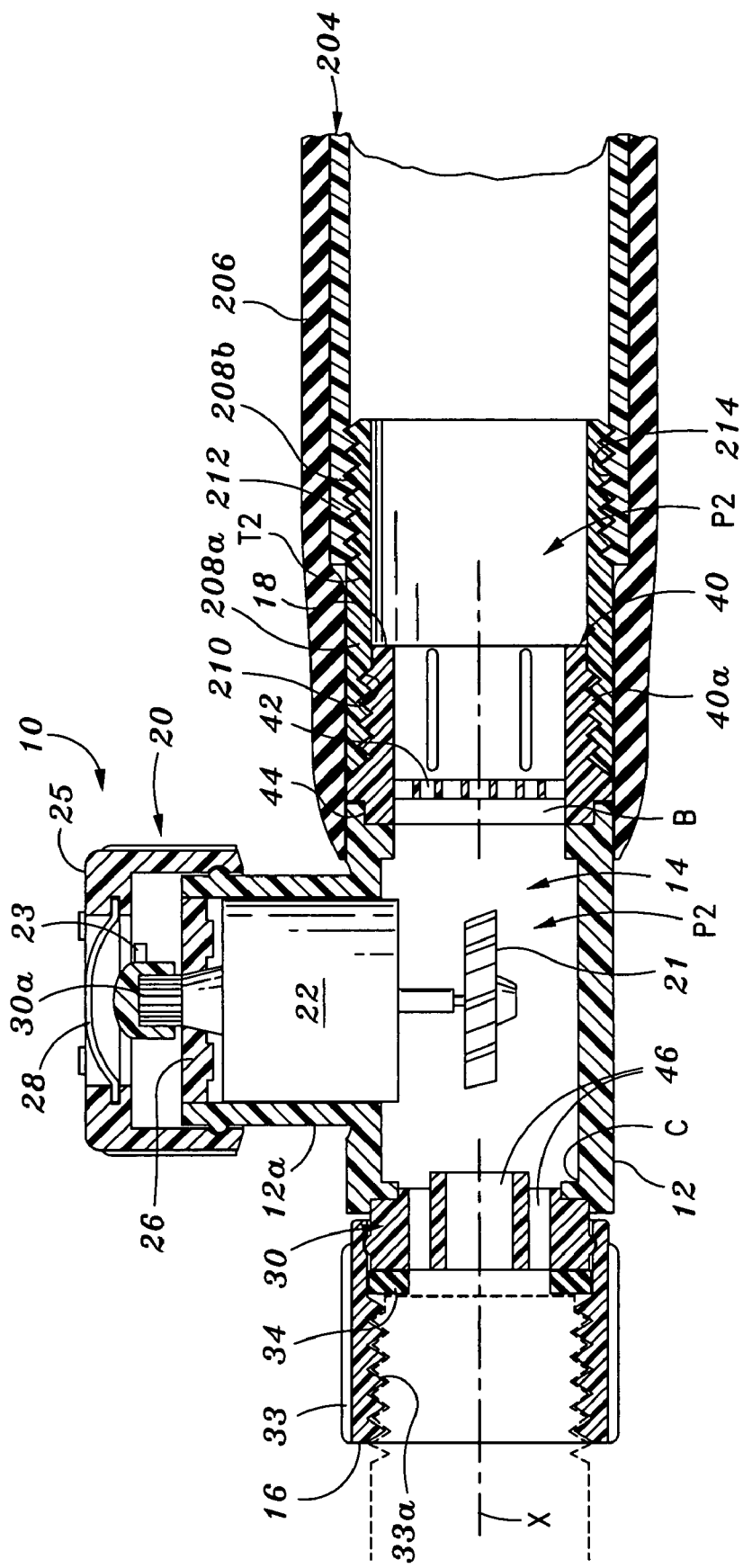
FIG. 7A is a cross-sectional view of the one embodiment of the liquid dispenser shown in FIG. 7 taken along line 7A-7A of FIG. 7.

This invention includes the one embodiment of the volume meter 10 shown in FIGS. 1 through 5 and the different embodiments of the liquid dispenser, FIGS. 6, 6A and 6B illustrating the dispenser 100, FIG. 7 and 7A illustrating the dispenser 200, and FIG. 8 illustrating the dispenser 300.

Volume Meter

Figure 1:
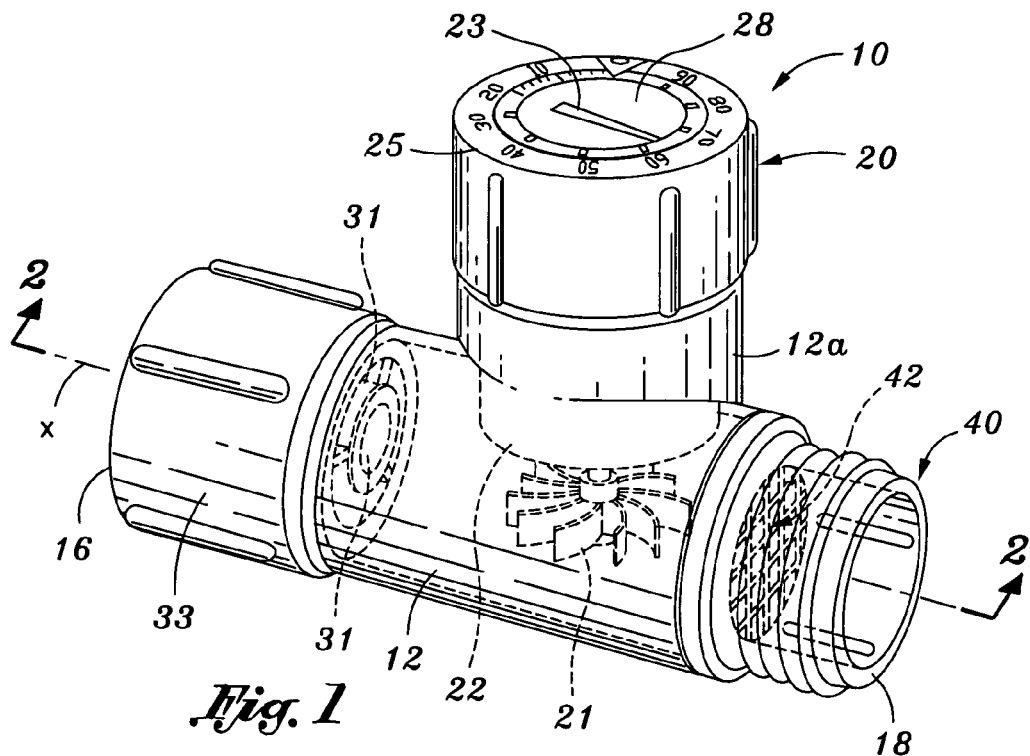
FIG. 1 is a perspective view of one embodiment of a volume meter of this invention, with some internal components shown in phantom lines.
Figure 2:
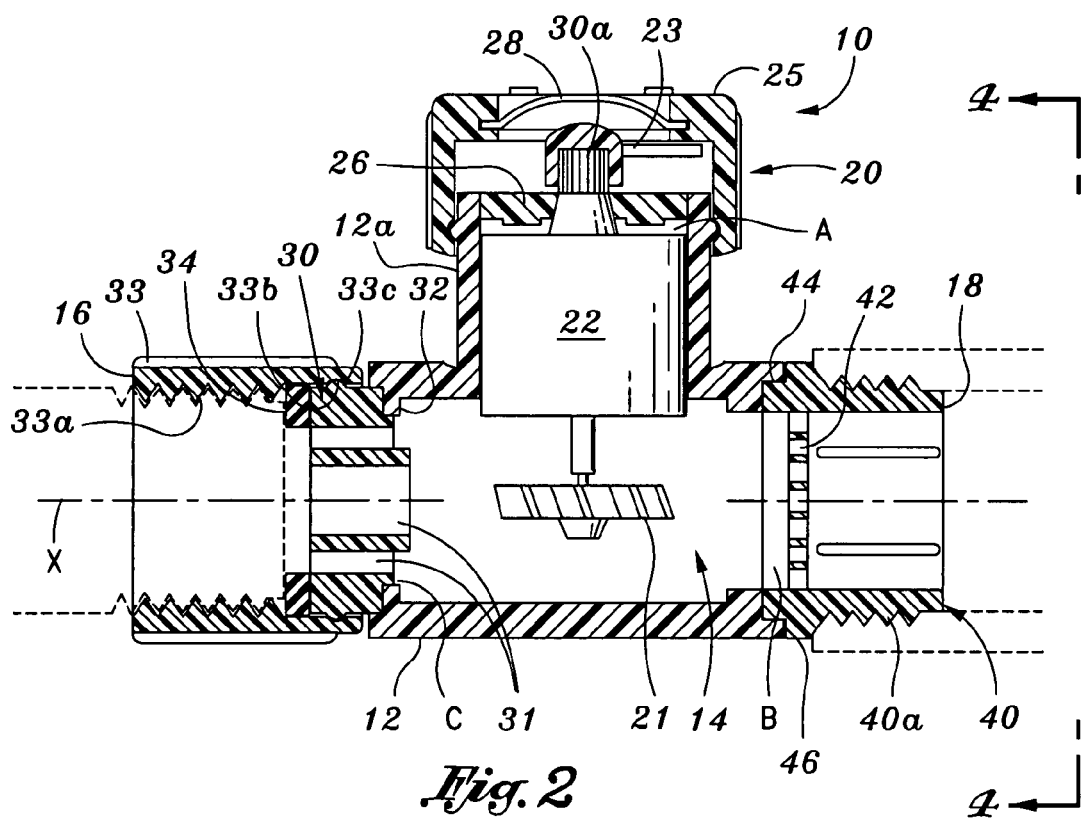
FIG. 2 is a cross-sectional view of the one embodiment of the volume meter shown in FIG. 1 taken along line 2-2 of FIG. 1.

As depicted best in FIGS. 1 and 2, the volume meter 10 includes a substantially cylindrical, tubular body 12 with a substantially cylindrical, tubular T-section 12a at substantially a right angle to the longitudinal axis X of the tubular body 12. The volume meter 10 has an inlet end 16 and an outlet end 18. A gauge 20 is seated on the top of the T-section 12a, and an impeller 21 is coupled to the gauge through a gear-box 22 seated in the T-section. The gear-box 22 includes planetary gears (not shown). The impeller 21 is downstream of the inlet end 16 of the volume meter 10. The liquid flowing between the ends 16 and 18 drives the impeller 21 that turns the planetary gears (not shown) in the gear-box 22.

An output gear shaft 30a extending from the gear-box 22 turns a needle indicator 23 of the gauge 20 that is attached to this output gear shaft. The position of the needle indicator 23 provides a visual readout indicating the volume of liquid flowing through the meter 10 in proportion to the number of revolutions of the impeller 21. The liquid flowing between the ends 16 and 18 drives the impeller 21, which turns the planetary gears (not shown) to rotate the needle indicator 23 so that it points to numerals marked incrementally on the perimeter of a substantially cylindrical cap 25. These numerals are in sequence and comprise a scale with the numerals corresponding to the to different volumes of liquid flowing through the meter 10. The cylindrical cap 25 has a central opening covered by a lens 28. As best depicted in FIG. 5, the needle indicator 23 is pointing to the numeral 60 showing that about 60 gallons of liquid is flowing through the meter 10.

The tubular body 12 provides at least in part a passageway 14 extending from the inlet end 16 to the outlet end 18. The outlet end 18 has a circular cross-sectional configuration substantially the same as the cross-sectional configuration of the tubular body 12 and a predetermined cross-sectional area substantially the same as to the cross-sectional area of the tubular body. In many cases, this cross-sectional area is from about 0.5 square inches to about 3 square inches. The passageway 14 is substantially linear.

The tubular body 12 and its T-section 12a are molded from plastic, with openings A, B and C therein (FIG. 2). The assembled gear-box 22 and attached impeller 21 are slid into the open end A of the T-section 12a and a cover 26 is force fitted into this open end A and bonded thereto. Seals or other measures may be employed to prevent leakage past the cover 26. The needle indicator 23 is then attached to the output gear shaft 30a extending through the cover 26. The cylindrical cap 25, including the lens 28, is then snapped onto the open end A of the T-section 12a. A spider-type, flow director 30 is force fitted into the open end C, which has an adjacent annular flange 32 that acts as a stop to limit the inward movement of the flow director. A plurality of parallel guideways 31 in the flow director 30 suppress turbulent flow and direct the incoming liquid so that it approaches laminar flow. A coupling 33 with an internal thread 33a is snapped onto the flow director 30 with a washer 34 abutting the outside surface of the flow director. The coupling 33 has an internal annular groove 33b into which an annular lip 33c of the flow director 30 fits upon snapping the coupling onto the flow director. This attaches the coupling 33 to the inlet end 16 in a manner enabling it to rotate freely so that the meter 10 may, for example, be manually connected and disconnected to an end of a hose.

One feature of this invention is an open-ended, substantially cylindrical cap 40 connected to the open end B. This cap 40 forms at least in part the outlet end 18 of the meter 10, and it includes a grid member 42 and an external threaded portion 40a. The cap 40, including the grid member 42, is molded from plastic to provide a unitary structure. There is an annular recessed edge 44 at the inner end of the cap 40 that mates with a step 46 in the opening B at the end of the tubular body 12. The grid member 42 is downstream of the impeller 21 and adjacent to and covering the opening B.

The grid member 42 has an open area comprising from about 50 to about 80 percent of the cross-sectional area of the outlet end 18. In the embodiment illustrated, the grid member 42 is substantially planar, substantially disk shaped, and substantially at a right angle to the longitudinal axis X. As best shown in FIGS. 3 and 4, the grid member 42 comprises a plurality of substantially flat and substantially straight arms 45 at substantially right angles to each other to form, except at the grid member's perimeter, substantially rectangular openings 47. As used herein, the word "rectangular" encompasses square or square-like configurations. If an inadequate supply of liquid is flowing through the volume meter 10, the impeller 21 does not rotate because it is not submerged in the liquid. The grid member 42 provides a means for restricting the flow of liquid through the volume meter 10 to retain liquid in the meter 10 so the impeller 21 remains substantially submerged in the flowing liquid, and therefore rotates. The grid member 42 is disposed along the passageway 14 downstream of the inlet end 16 of the volume meter 10.

Liquid Dispenser

Another feature of this invention is the combination of the volume meter discussed above with a sprayer device to provide the liquid dispenser of this invention.

The liquid dispenser 100 illustrated in FIGS. 6, 6A and 6B includes a sprayer device 102 and the volume meter 10 connected together to form an integral unit that prevents the sprayer device and volume meter from being disconnected without damaging the liquid dispenser. A common passageway P1 (FIG. 6A) extends through the sprayer device 102 and the volume meter 10. This passageway P1 is substantially linear and has a longitudinal axis XX and a predetermined cross-sectional area. Liquid flows into the inlet end 16 of the volume meter 10, along this common passageway P1 past the impeller 21 of the gauge 20, through the outlet end 18, into and through the sprayer device 102, exiting at a head end 102a (FIG. 6) of the sprayer device through small diameter holes (not shown) in the face 102b of the head end.

The sprayer device 102 and volume meter 10 each include a plastic body portion forming at least in part the common passageway P1. In this embodiment, the common passageway P1 includes the body 12 of the meter 10 and a tubular member T1 extending from a tail end 102c of sprayer device 102. These plastic body portions may be sonically welded together or bonded with an adhesive to connect the sprayer device 102 and volume meter 10 to form the integral unit. Consequently, the sprayer device 102 and the volume meter 10 cannot be separated or disconnected without damaging the liquid dispenser 100.

As shown in FIGS. 6 and 6A, the sprayer device 102 includes a manually operated valve 104 that enables the user to rotate it between a completely open position and a completely closed position. As shown in FIG. 6A, with the valve 104 in the open position, a plate 104a (FIG. 6A) of the valve seated in the passageway P1 is turned so that the passageway P1 is unblocked. In the closed position, the plate 104a is positioned at a right angle to the longitudinal axis XX to block the passageway P1 and prevent liquid from flowing past this plate. The grid member 42 is upstream of the valve 104 and is substantially at a right angle to the longitudinal axis XX.

As depicted in FIG. 6B, the sprayer device 102 has on its underside a stand 106 that has one end 106a connected by a pivot joint 106b and its other end 106c seated in a holder 108. This stand 106, upon manually pulling the one end 106c from the holder 108, allows the sprayer device 102 to be propped up, with the one end 106c push into the ground to point the head end 102a of the sprayer device 102 upwardly.

The tubular member T1 is substantially linear and has a proximal end 110 (FIG. 6A) including an internal treaded section 112. The external threaded portion 40a of the outlet end 18 of the volume meter 10 is screwed into this internal treaded section. These treaded sections engage and are bonded together by sonically welding or by applying an adhesive to the connection so that they cannot be manually unscrewed.

The liquid dispenser 200 illustrated in FIGS. 7 and 7A includes a sprayer device 202 and the volume meter 10 connected together to form an integral unit that prevents the sprayer device and volume meter from being disconnected without damaging the liquid dispenser. A tubular member T2 (FIG. 7A) forms a common passageway P2 that extends into both the sprayer device 202 and the volume meter 10 to enable liquid to flow through the dispenser 200.

As illustrated in FIG. 7, the sprayer device 202 includes a head 202a having a manually operable adjusting mechanism 202b that enables a user to change the type of spray pattern of liquid issuing from the face 202c of the head. By rotating the adjusting mechanism 202b a user adjusts or selects the type of spray pattern desired. A handle 204 projects at about 90° downward from the head 202a and is covered with a flexible, resilient sheet 206. A valve (not shown) is located in the head 202a to control the flow of liquid from the head. A stem 212 of the valve (not shown) has one end connected to a lever 214 that is manually depressed to open and close the valve (not shown).

The tubular member T2 has a cross-sectional configuration and area substantially the same as the cross-sectional configuration and area of the outlet end 18 to facilitate connecting the sprayer device 202 and volume meter 10. Specifically, as best shown in FIG. 7A, a proximal end 208a of the tubular member T2 has an internal threaded section 210 screwed onto the threaded portion 40a of the cylindrical cap 40, and a distal end 208b has an external threaded section 212 screwed into an internal threaded portion 214 of the handle 204. These threaded sections are bonded together as discussed above to prevent the sprayer device 202 and the volume meter 10 from being disconnected without damaging the dispenser 200.

The liquid dispenser 300 illustrated in FIG. 8 includes a nozzle-type sprayer device 302 and the volume meter 10 connected together to form an integral unit that prevents the sprayer device and volume meter from being disconnected without damaging the liquid dispenser. This nozzle-type sprayer device 302 has an external section 302a mounted on an internal section 302b to rotate to control the type of spray pattern issuing from the sprayer device 302. There is an internal threaded section (not shown) in the internal section 302b into which the threaded portion 40a of the cylindrical cap 40 is the screwed into.

General

It is advantageous to mold, were possible, the components of the meter 10 and the liquid dispensers 100, 200 and 300 from a plastic that may be sonically welded, and therefore, facilitates connecting and bonding the meter and the sprayer together as an integral unit. It is also possible to mold from a plastic the tubular bodies of the meter and the spray device as a single unitary structure that provides the integral unit instead of welding or gluing two pieces together. Such a suitable plastic is, for example, ABS (acrylonitrile-butadiene-styrene) resin.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

The invention claimed is:

1. A volume meter comprising
    a hollow open-ended substantially cylindrical body forming a substantially linear passageway through said body,
    a gauge member connected to the body that displays the volume of liquid flowing along the passageway,
    an impeller member driven by the liquid flowing along the passageway and connected to the gauge member to actuate an indicator member of the gauge member to provide a visual readout indicating the volume of liquid flowing through the volume meter in proportion to the number of revolutions of the impeller member, and
    a substantially cylindrical open ended cap member including an open grid member that is substantially planar, substantially disk shaped and substantially at a right angle to the linear passageway where the cap member has an inner annular edge portion that fits snugly within an end of the cylindrical body.

2. The volume meter of claim 1 where the cap member is a molded plastic unitary structure and said grid member comprises a plurality of substantially flat and substantially straight arms at substantially right angles to each other to form substantially rectangular openings.

3. A volume meter comprising
    a hollow substantially cylindrical body made of a plastic and including an inlet end portion, an outlet end portion having a predetermined cross-section area, and a substantially linear and substantially cylindrical passageway extending between said end portions,
    a gauge member downstream of the inlet end portion that responds to a liquid flowing along the passageway to provide a visual readout indicating the volume of said liquid flowing through the volume meter, and
    a substantially cylindrical cap member made of a plastic and having an outer threaded portion, said cap member forming at least in part the outlet end portion and including an annular recess at an inner end thereof that fits snugly in the passageway and is bonded to the cylindrical body,
    said cap member including a grid member having an open area comprising from 50 to 80 percent of the cross-section area of the outlet end portion, said grid member being substantially planar, substantially disk shaped, and substantially at a right angle to the longitudinal axis.

4. The volume meter of claim 3 where the cap member is a molded unitary structure and said grid member comprises a plurality of substantially flat and substantially straight arms at substantially right angles to each other to form substantially rectangular openings.

\* \* \* \* \*